Patented Aug. 18, 1953

2,649,437

UNITED STATES PATENT OFFICE 2,649,437

SOLUBLE, FUSIBLE, CONVERTIBLE, UNSATURATED INTERPOLYMERS OF SELECTED DI-2-ALKENYL CITRACONATES OR MESACONATES AND SELECTED 2-ALKENYL ALCOHOLS OR CHLORIDES

Pliny O. Tawney, Passaic, N. J., assignor to United States Rubber Company, New York, N. Y., a corporation of New Jersey No Drawing. Application November 15, 1949, Serial No. 127,525

2 Claims. (Cl. 260—78.5)

The invention relates to a new class of soluble, unsaturated interpolymers which can be converted by further polymerization to insoluble and heat-resistant products under the influence of heat and/or catalysts. Specifically, the invention relates to soluble, unsaturated polymeric materials derived from di-2-alkenyl citraconates and/or mesaconates.

The di-2-alkenyl citraconates and mesaconates can be relatively slowly but quite readily converted to polymeric materials. Polymeric di-2-alkenyl citraconates and mesaconates display excellent flexibility and for this reason are of unusual interest for the formulation of improved coating compositions which require an initially soluble, fusible resin capable of ultimate conversion to an insoluble, heat-resistant state after application to the appropriate surface, usually in the presence of solvents.

However, the commercial utilization of the polymeric di-2-alkenyl citraconates and mesaconates is deterred not only by their present high cost but more by the fact that by ordinary methods only a minor amount, say about 30%, of the monomeric starting material can be converted to the soluble, unsaturated polymeric form before gelation of the reaction mixture occurs. The intractable gel form of polymer is useless for most coating applications and hence the polymerization must be halted before gelation occurs, the desired soluble, unsaturated polymer isolated and the large amount of unreacted monomer recovered and recycled for use in subsequent polymerization runs. Such a process is prohibitively expensive and is not commercially feasible.

I have now discovered a method whereby the major proportion of a di-2-alkenyl citraconate or mesaconate can be converted to the soluble, polymeric form without danger of gelation. The method of my invention consists in copolymerizing the di-2-alkenyl citraconate or mesaconate with a 2-alkenyl alcohol or chloride from the class represented by the formula

XCH=CX—CH₂—Z wherein one X is hydrogen and the other X is a radical from the class of hydrogen, lower alkyl (e. g., methyl and ethyl) and chlorine, and Z is one of the radicals hydroxyl and chlorine. Exemplary of such compounds are allyl, 2-methallyl, 2-ethylallyl and crotyl alcohols, and allyl, methyl and 2-chloroallyl chlorides.

I have found that the presence of as little as about 0.2 mole of the 2-alkenyl chloride or alcohol, per mole of the di-2-alkenyl citraconate or mesaconate is sufficient to effect a significant increase in the conversion of the monomeric di-2-alkenyl ester to the soluble polymeric form. Moreover, this conversion increases with the presence of increased amounts of the copolymerizable 2-alkenyl chloride or alcohol, and when from 3 to 6 moles thereof are present per mole of the di-2-alkenyl ester, the major proportion of the latter is readily converted to the soluble, unsaturated polymeric form without danger of premature gelation. In most cases I use an amount of the 2-alkenyl alcohol or chloride such that at least 50% of the di-2-alkenyl ester is converted to soluble interpolymeric form. I can use an even greater amount of the 2-alkenyl alcohol or chloride, say an amount ranging upwardly to a molar ratio thereof to the di-2-alkenyl ester as high as 20:1 or even higher. By the use of such excesses, the 2-alkenyl alcohol or chloride serves not only to repress gelation but also as a diluent for the polymerization reaction mixture. While I may use any amount of the 2-alkenyl alcohol or chloride ranging upwardly from 0.2 mole thereof per mole of the ester, in many cases I use an amount ranging from 2 moles to 10 moles thereof per mole of ester, and more commonly from 3 to 6 moles thereof per mole of the ester.

The 2-alkenyl alcohols and chlorides are unusually effective in repressing gelation of the polymerizing di-2-alkenyl esters in accordance with my invention. As a class, the 2-alkenyl chlorides are more effective than the corresponding alcohols in repressing gelation of the reaction mixture and in imparting flame-retardant properties to the resulting interpolymer, although the 2-alkenyl alcohols are preferred where optimum resistance to thermal discoloration is desired in the interpolymers.

Suitable di-2-alkenyl citraconates and mesaconates for my invention are the esters of the above described 2-alkenyl alcohols with citraconic and mesaconic acid, particularly the diallyl and dimethallyl esters, viz., diallyl citraconate, dimethallyl citraconate, diallyl mesaconate and dimethallyl mesaconate. Of these, the citraconic acid esters are preferred because of their generally faster rate of copolymerization in my process.

In the practice of my invention, the mixture of the 2-alkenyl alcohol or chloride with the di-2-alkenyl citraconate or mesaconate is heated at an elevated temperature, preferably from 50° to 120° C. The reaction is initiated by the known free-radical polymerization initiators, which decompose thermally under the reaction conditions with liberation of free radicals which initiate the polymerization, such as peroxy compounds, especially organic peroxides, e. g., benzoyl peroxide, acetyl peroxide and tertiary-butyl hydrogen peroxide, and aliphatic azo compounds, e. g., alpha, alpha'-azobisisobutyronitrile.

The progress of the reaction can be followed by observing the increase in the viscosity of the reaction mixture. The reaction is generally terminated before any substantial amount of gel forms, commonly at a point just short of gelation, i. e., at the point of incipient gelation. At the end of the reaction, the soluble interpolymeric product can be isolated by preferential extraction, precipitation with a non-solvent, e. g., n-hexane, or by distillation of any unreacted starting materials.

These interpolymers can be admixed with solvents, e. g., acetone and xylene, dyes, plasticizers, pigments and/or fillers for use in molding, coating and impregnating operations. After application, they can be cured to a solvent-resistant and heat-resistant state by heat, e. g., 100–200° C., and/or a catalyst or drier, e. g., benzoyl peroxide or manganese naphthenate. The interpolymer compositions containing catalyst or drier have air-drying properties. The soluble interpolymers can also be admixed with copolymerizable mono-olefinic compounds such as diethyl fumarate, acrylonitrile, styrene and butyl acrylate and thereafter cured as described above to secure products in which a minimum amount of shrinkage has occurred.

The following examples disclose my invention in more detail; all parts are by weight.

*Example 1*

Mixtures of diallyl mesaconate and of diallyl citraconate with various allylic alcohols and chlorides are heated at 60° C. with benzoyl peroxide until the point of incipient gelation is attained or until no further increase in the viscosity of the reaction mixture is detectable. Where the reaction times appreciably exceed 24 hours, it is preferable to add the peroxide incrementally at ea. 24 hour intervals.

The reaction mixtures are then diluted with n-hexane and the precipitated interpolymers are further purified by repeated solution in a minimum volume of acetone and reprecipitation with n-hexane, after which they are finally dried in vacuum to constant weight.

The polymerization is summarized below in the table which also includes polymerization runs (*a* and *f*) according to the prior art in the absence of my allylic alcohols and chlorides to emphasize the advantages of my invention.

TABLE

| | Di-2-Alkenyl Ester | | 2-Alkenyl Compound | | Benzoyl Peroxide | Reaction Time (Hrs.) | Soluble Polymeric Product |
|---|---|---|---|---|---|---|---|
| a | Diallyl Citraconate | 100 | | | 0.5 | 0.75 | 27.7 |
| b | do | 100 | Allyl Alcohol | 80.1 | 0.5 | 60.0 | 86.0 |
| c | do | 100 | do | 150.0 | 0.5 | ¹ 76.0 | 99.0 |
| d | do | 100 | Methallyl Alcohol | 150.0 | 1.9 | ¹ 97.0 | 102.0 |
| e | do | 100 | Methallyl Chloride | 150.0 | 0.5 | ¹ 76.0 | 127.3 |
| f | Diallyl Mesaconate | 100 | | | 0.5 | 16.0 | 29.0 |
| g | do | 100 | Allyl Alcohol | 150.0 | 0.5 | ¹ 60.0 | 51.5 |

¹ No evidence of incipient gelation.

*Example 2*

Repetition of Example 1–*e* above yields a copolymer having a Wijs iodine number of 90 and a chlorine content of 5.09%, indicating a copolymer containing approximately 13% of methallyl chloride and 87% of diallyl citraconate.

The iodine number indicates the residual ethylenic unsaturation extent in the interpolymer and available for further polymerization. This is illustrated by spreading a film of the interpolymer on a glass plate and baking at ca. 200° C. to secure an acetone-insoluble film.

Having thus described my invention, what I claim and desire to protect by Letters Patent is:

1. The process which comprises heating a mixture of monomers consisting of monomeric diallyl citraconate and monomeric allyl alcohol in relative proportions of from 0.2 to 20 moles of said allyl alcohol per mole of said diallyl citraconate in the presence of an organic peroxide which is a free radical polymerization initiator for a time sufficient to form an acetone-soluble, fusible, unsaturated interpolymer of said monomers, and interrupting the polymerization at a point prior to the onset of gelation.

2. A process as recited in claim 1 wherein the relative proportions of said monomers range from 3 to 6 moles of said allyl alcohol per mole of said diallyl citraconate.

PLINY O. TAWNEY.

References Cited in the file of this patent

UNITED STATES PATENTS

| Number | Name | Date |
|---|---|---|
| 2,332,900 | D'Alelio | Oct. 26, 1943 |
| 2,433,616 | Marple et al. | Dec. 30, 1947 |
| 2,498,084 | Kuderna et al. | Feb. 21, 1950 |
| 2,504,052 | Snyder | Apr. 11, 1950 |
| 2,546,798 | Tawney | Mar. 27, 1951 |
| 2,592,211 | Tawney | Apr. 8, 1952 |